United States Patent
Odom, Jr.

(10) Patent No.: US 7,913,600 B2
(45) Date of Patent: *Mar. 29, 2011

(54) TOURNE CUTTING METHOD AND DEVICE

(76) Inventor: Donald Odom, Jr., Newark, DE (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/167,325

(22) Filed: Jul. 3, 2008

(65) Prior Publication Data

US 2008/0314222 A1 Dec. 25, 2008

Related U.S. Application Data

(60) Continuation-in-part of application No. 11/842,202, filed on Aug. 21, 2007, now abandoned, which is a division of application No. 11/161,110, filed on Jul. 22, 2005, now Pat. No. 7,278,346.

(51) Int. Cl.
*B26D 3/00* (2006.01)
*B26D 7/01* (2006.01)

(52) U.S. Cl. ............ 83/762; 83/454; 83/932; 99/596

(58) Field of Classification Search .......... 83/932, 83/454, 761–767, 574, 821, 828; 99/539–541, 99/584, 588, 599, 537, 567, 568, 574, 576; 30/390

See application file for complete search history.

(56) References Cited

U.S. PATENT DOCUMENTS

| | | | |
|---|---|---|---|
| 1,004,204 A | 9/1911 | Rost | |
| 1,006,621 A | 10/1911 | Arnold | |
| 2,130,980 A | 9/1938 | Chattin et al. | |
| 2,339,722 A | 1/1944 | Ricksham | |
| 2,483,930 A | 10/1949 | Pauls | |
| 2,521,987 A | 9/1950 | Mason | |
| 2,661,039 A * | 12/1953 | Davis et al. | 99/513 |
| 3,433,105 A | 3/1969 | Barickman | |
| 3,554,253 A * | 1/1971 | Vasile | 99/507 |
| 4,137,807 A * | 2/1979 | Schaumberg | 83/599 |
| 4,137,839 A | 2/1979 | Couture et al. | |
| 4,356,749 A | 11/1982 | Spencer | |
| 4,738,195 A | 4/1988 | Berube et al. | |
| 4,765,234 A | 8/1988 | Cailliot | |
| 4,936,204 A * | 6/1990 | Whitmarsh | 99/538 |
| 5,251,543 A * | 10/1993 | Brothers | 99/538 |
| 5,582,096 A | 12/1996 | Marton | |
| D397,921 S | 9/1998 | Joergensen | |
| 5,950,528 A | 9/1999 | Wang | |
| 5,957,045 A | 9/1999 | He et al. | |
| 5,979,281 A * | 11/1999 | Caesar | 83/167 |
| 6,148,704 A * | 11/2000 | Lewis | 83/167 |

(Continued)

FOREIGN PATENT DOCUMENTS

JP 6141991 5/1994

*Primary Examiner* — Stephen Choi
(74) *Attorney, Agent, or Firm* — Connolly Bove Lodge & Hutz LLP

(57) ABSTRACT

A cutting device holds an article to be cut stationary while a blade is traversed along a curved guide to peel or slice away material from the article. The article may be rotated using an indexing mechanism to realign the article with respect to the blade. The cutting device is especially configured to cut complex shapes, such as a seven-sided tourné. Portions of the cutting device may be separated for storage or travel, and a storage container may be provided to protect the device as well as to keep the separated pieces together.

15 Claims, 4 Drawing Sheets

U.S. PATENT DOCUMENTS

| | | |
|---|---|---|
| 6,269,740 B2 | 8/2001 | Kojs |
| 6,408,520 B1 | 6/2002 | Ridler |
| 6,484,627 B1 | 11/2002 | Peter |
| 6,659,522 B2 | 12/2003 | Byth |
| 6,732,622 B2 | 5/2004 | Vincent et al. |
| 2003/0194189 A1* | 10/2003 | Grothe et al. .......... 385/88 |

\* cited by examiner

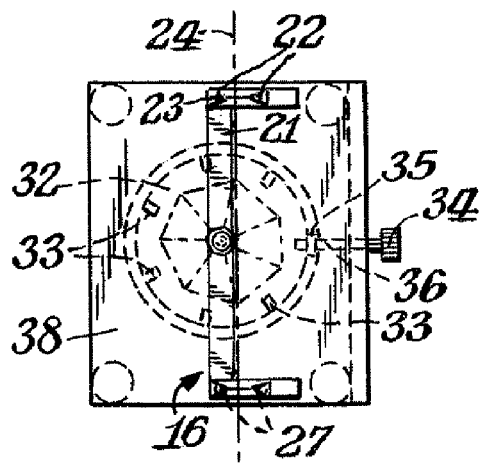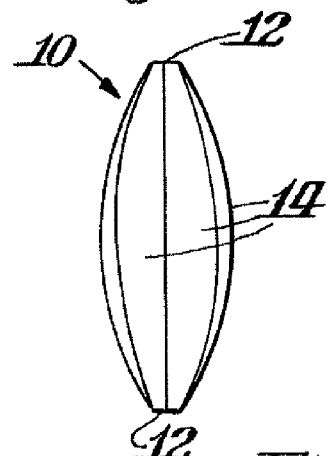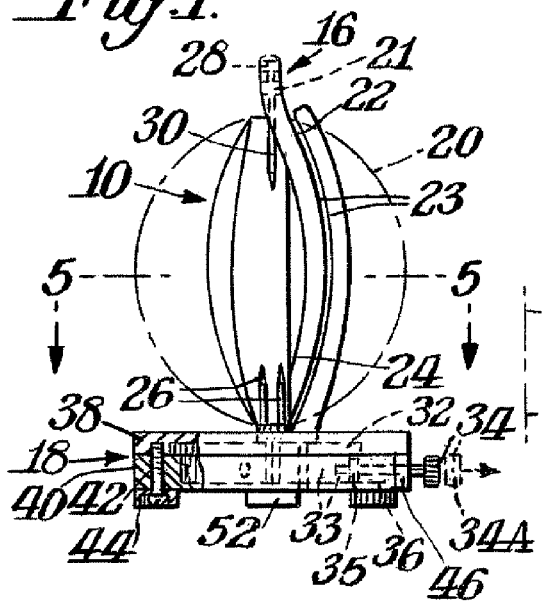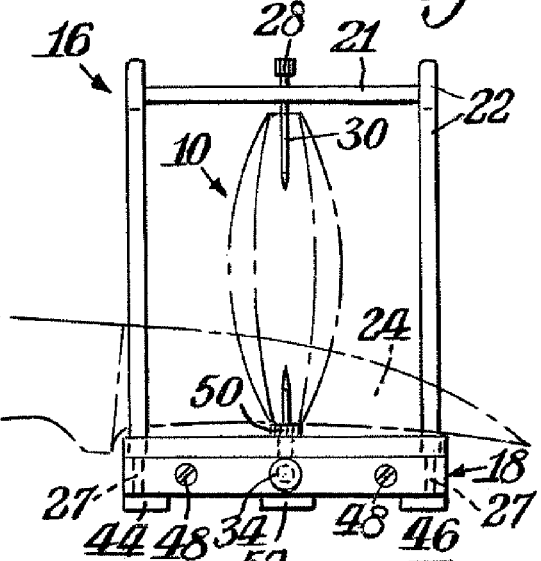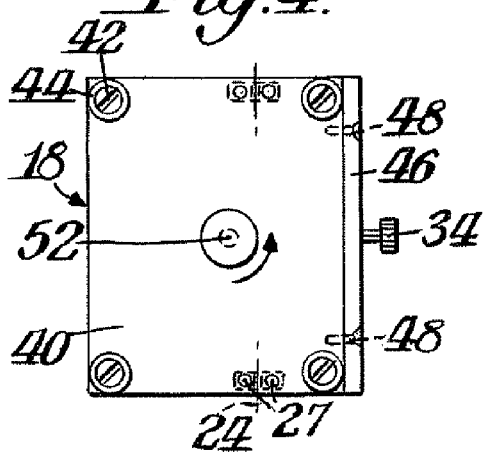

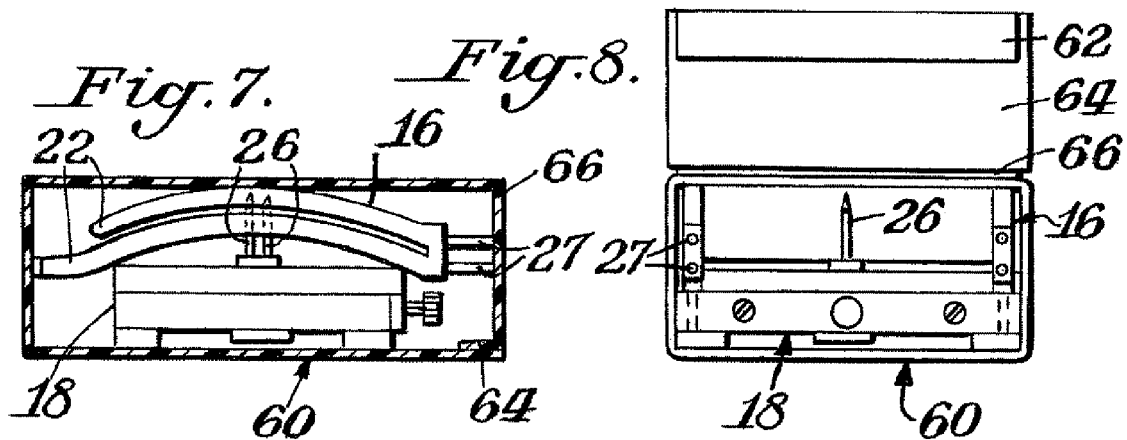

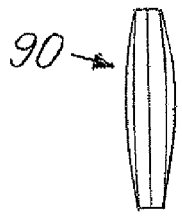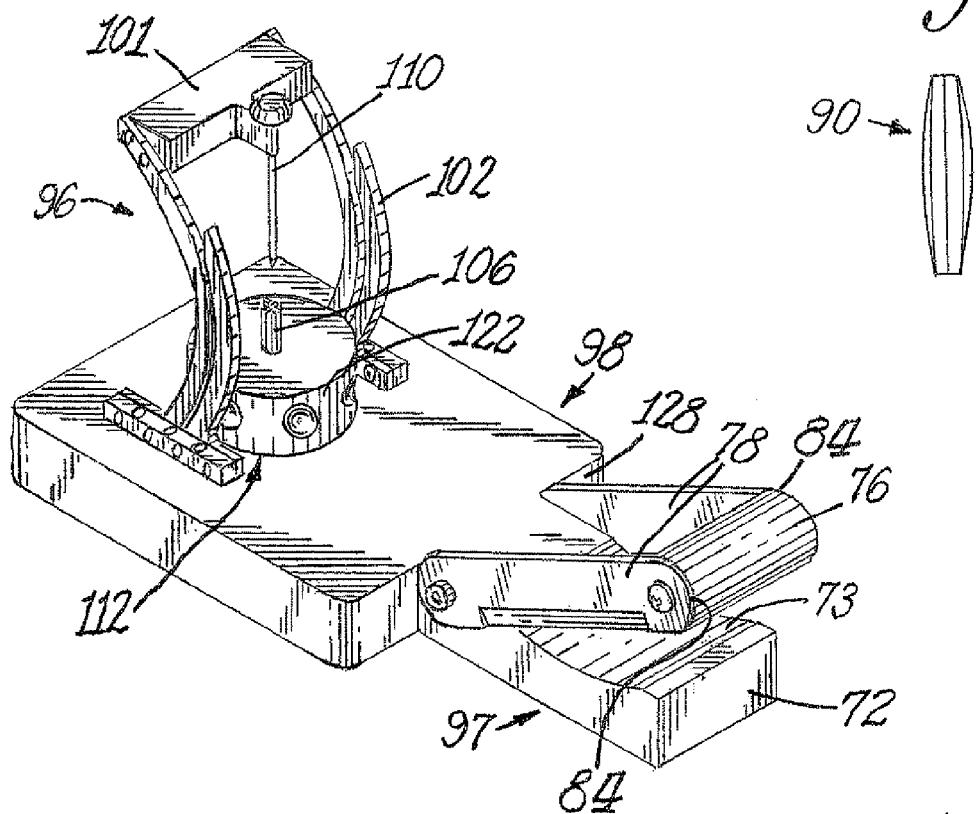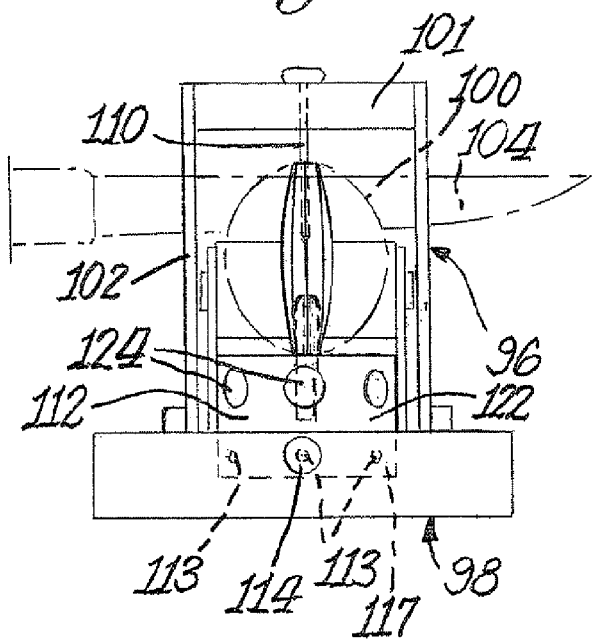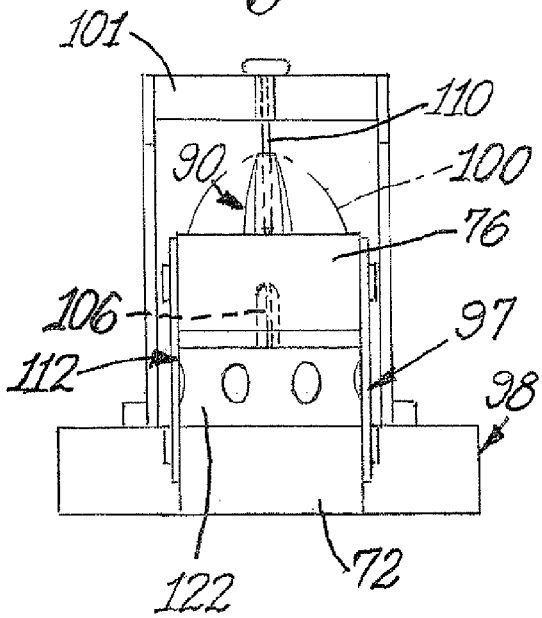

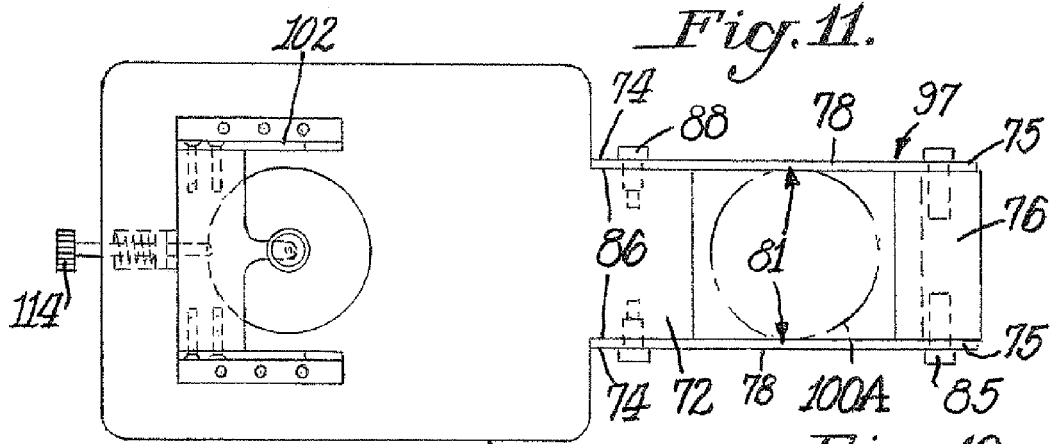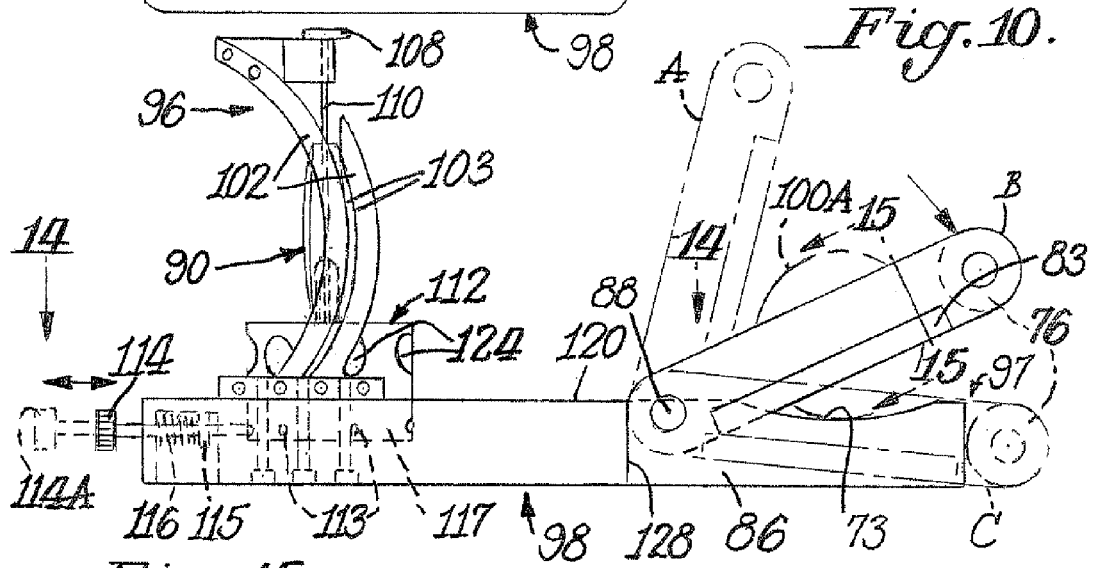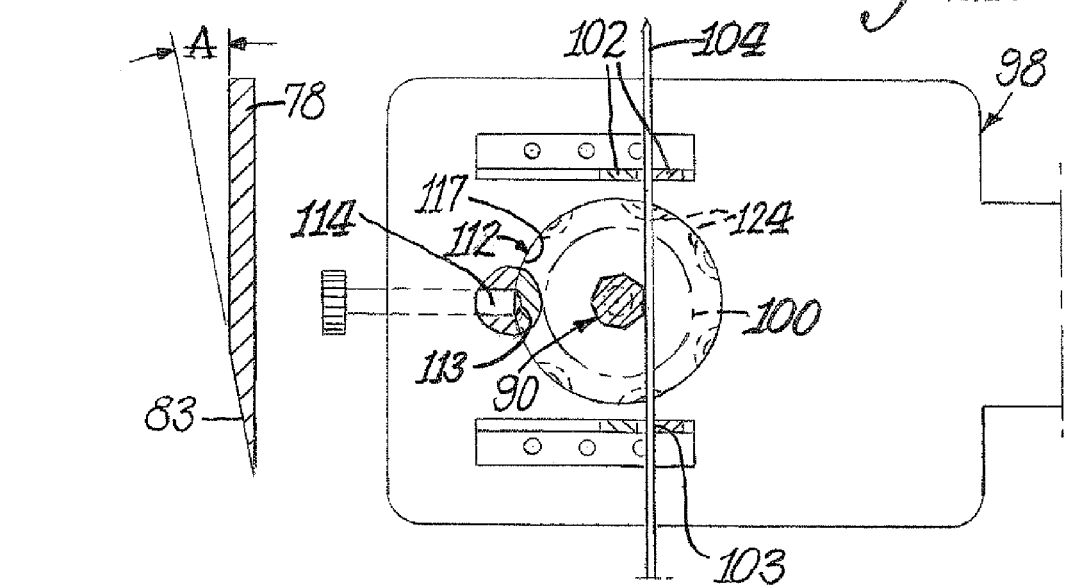

TOURNE CUTTING METHOD AND DEVICE

REFERENCE TO RELATED APPLICATIONS

The present application is a continuation-in-part of application Ser. No. 11/842,202, filed Aug. 21, 2007, now pending, and Ser. No. 11/161,110, filed Jul. 22, 2005, which issued as U.S. Pat. No. 7,278,346, the disclosures of which are incorporated herein by reference for any and all useful purposes.

BACKGROUND OF THE INVENTION

1. Field of the Invention

The present invention relates generally to the art of slicing, and more particularly to the art of cutting food items into desired shapes.

2. Description of the Related Art

Slicing shapes in vegetables is generally well known in the culinary art. In particular, the tourné shape is highly regarded for its uniqueness. As shown in FIG. 6, the tourné 10 is roughly flat on two opposing ends 12 and has, extending between those opposing ends 12, seven sides 14 of approximately the same size and at approximately equal angles to each other. The seven sides 14 are tapered at the ends of the vegetable or root, so that the tourné is widest at its midsection and narrowest at the two ends 12.

The tourné shape is unique because it has an uneven number of curved or arced sides. Such shape is desired for food items, such as vegetables and roots, particularly potatoes. However, the unusual shape is difficult to accurately produce by manual cutting. Thus, recreating the tourné shape typically requires a great deal of effort, time, and skill. It would be very desirable to form the tourné shape quickly and efficiently using a device that is simple, portable, and easy to clean.

U.S. Design Pat. No. 397,921 to Joergensen shows a manual potato peeler with a handle and blade. Such peelers and blades are well known in the art, but require great skill to create complex designs.

Peeling apparatuses that hold an article during peeling are generally well known in the culinary art. For example, U.S. Pat. Nos. 1,006,621; 2,130,980; 2,521,987; 4,738,195; 4,765,234; 5,950,528; 5,957,045 and 6,408,520 teach various peeling, slicing and coring machines. However, these devices are incapable of shaping an article into a tourné, i.e., a three-dimensional shape with seven arced sides.

U.S. Pat. No. 5,582,096 to Marton illustrates a more complex vegetable peeling and shaping machine. A potato is held in a chute or tube as blades are fed into and out of slots through the tube or chute to cut portions of the potato away. Similarly, Japanese publication JP 06141991 A illustrates a vegetable cutter, comparable to Marton, that utilizes cutting edges that travel through guides 3 to form curved surfaces. These devices permit the creation of complex shapes, such as the symmetrical "Chateau" shape. However, these devices are complex, relatively expensive, difficult to clean, and relatively difficult to move about or use in a typically crowded kitchen.

Commercial and home chefs still seek a device for forming complex cut shapes, such as a tourné, that is simple, portable, handheld, and easy to clean.

SUMMARY OF THE INVENTION

In a first aspect of the invention, a cutting device is provided that holds an article stationary while a blade is traversed along a curved track or blade guide to peel or slice away material from the article. The article may be rotated using an indexing mechanism to re-align the article with respect to the blade and form a shaped article, such as a seven sided tourné. Prior to being shaped, the article may be pre-sized using a chopper portion. The article to be cut may be a root or vegetable, such as a potato. Additionally, portions of the cutting device may be separated for storage or travel, and may have a container to protect the device as well as to keep the separated pieces together.

In a second aspect of the invention, a cutting method includes the steps of chopping an article to a predetermined size, fixing the article to be cut to a base portion of a cutting device and to a cutting portion of the cutting device, where the cutting portion includes a blade guide or track. After fixing the article, a blade is moved along the blade guide from a start position to slice through a portion of the article with a first pass of the blade along the blade guide. The article is indexed to a new cutting position, such as by rotating, and the blade is returned to its start position within the blade guide in preparation for a second cutting pass along the blade guide. Preferably, indexing the article is by disengaging an engagement mechanism that fixes the position of the article relative to the cutting portion and rotating the article to a new position. Preferably, the engagement mechanism has seven indexed positions to permit cutting portions from the article to form a seven-sided tourné. The base portion optionally may be handheld when carrying out the cutting method.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar reference characters refer to similar parts and in which:

FIG. 1 illustrates a side elevational view of an apparatus used to slice an article, such as a potato, into a tourné shape;

FIG. 2 is a front elevational view of the apparatus of FIG. 1;

FIG. 3 is a top plan view of the apparatus of FIG. 1;

FIG. 4 is a bottom plan view of the apparatus of FIG. 1;

FIG. 5 is a cross-sectional plan view taken along line 5-5 of FIG. 1;

FIG. 6 is a side elevational view of a finished tourné shaped cut article, such as a potato;

FIG. 7 is a side elevational view of the apparatus of FIG. 1 with its guide and base nested together in a container shown in cross-section; and FIG. 8 is an end elevational view of the apparatus with the nested guide and base in a container of FIG. 7, wherein the container lid is shown in open position.

FIG. 9 illustrates a perspective view of another apparatus used to chop and slice an article, such as a potato, into a tourné shape;

FIG. 10 is a side elevational view of the apparatus of FIG. 9 with the chopping portion shown in an open, closing, and closed position.

FIG. 11 is a top plan view of the apparatus in FIG. 9;

FIG. 12 is a rear elevational view of the apparatus of FIG. 9;

FIG. 13 is a front elevational view of the apparatus of FIG. 9;

FIG. 14 is a partial cross-sectional plan view of the apparatus of FIG. 9 taken along line 14-14 of FIG. 10;

FIG. 15 is a cross-sectional plan view of a chopping blade taken along line 15-15 of FIG. 10; and FIG. 16 is side elevational view of a narrower finished tourné shaped cut article, such as a potato.

DETAILED DESCRIPTION OF A PREFERRED EMBODIMENT

FIGS. 1-5 illustrate a tourné cutting device according to one embodiment of the present invention that comprises a cutting portion 16 and a base portion 18. As shown in FIG. 1, the cutting portion 16 and base portion 18 of the tourné cutting device engage an article 20, such as a potato, root, vegetable or other item, which is desired to be sliced into a tourné shape.

As shown in FIG. 2, the cutting portion 16 of the tourné cutting device has a blade guide 22 that is designed to accept any slicing means 24, such as a blade, wire or knife. Slicing means 24 is shown as a knife in FIGS. 1-5 to illustrate operation of the device, but is not meant to limit the invention. Guide 22 is shaped so as to guide knife 24 along a path that will cut the tourné profile into one side of the article 20. Support arm 21 supports guide 22 and may include a holder 30 for holding article 20 relative to the cutting portion 16. Any part of the cutting portion 16 may comprise metal, plastic, wood or other suitable material.

Article 20 can be fixed relative to cutting portion 16 and base portion 18, as shown in FIG. 1. For example, article 20 can be fixed to the base portion 18 by a first holder 26, such as a needle or double needle (double needle shown in FIG. 1), which may be inserted prior to joining the cutting portion 16 with base portion 18. Holder 26 may be inserted into article 20 by pressing the article 20 onto the holder 26. Cutting portion 16 may then be connected to base portion 18 by any conventional connecting means, such as friction pins 27, in which the connecting means may comprise metal, plastic, wood or other suitable material.

A second holder 30, which may be a needle or double needle (a single needle is shown in FIGS. 1 and 2), may then be inserted by pressing the head 28 of holder 30 toward article 20. Second holder 30 holds article 20 relative to the cutting portion 16. Although the FIGS. 1 and 2 illustrate needle shaped holders, any holding utensils may be used, such as those disclosed in U.S. Pat. No. 6,659,522 to Byth. Furthermore, article 20 may be initially fixed to cutting portion 16 by inserting holder 30 into article 20 and then fixing the article to holder 26 at the same time that cutting portion 16 is joined with base portion 18.

The blade guide 22 may be aligned relative to article 20 for cutting a first side of a tourné shape 10 simply by virtue of the fact that article 20 is fixed relative to the joined cutting portion 16 and base portion 18. Preferably, blade guide 22 permits blade 24 to travel along the guide without binding or other interruption to slice a side of article 20 into a predetermined shape, such as an arc in the case of the tourné shape. As shown in FIGS. 3 and 5, the cross-section of each side of guide 22 may contact blade 24 only at point 23 to reduce friction of blade 24 along the path of travel and to reduce scratching, dulling or other damage to blade 24.

As shown in FIGS. 1, 3, and 5, an indexing mechanism allows the repositioning of article 20 for creating multiple arced slices. As particularly shown in FIG. 3, indexing mechanism may comprise indexing plate 32, which may have a multiplicity of indexing positions 33, such as slots or holes, for receiving indexing pin 34. In the case of a tourné cutting device, indexing plate 32 may have, for example, seven engagement positions 33 to permit the formation of seven slices. Indexing pin 34 can be disengaged by pulling it outward from the indexing plate 32 into a disengaged position, such as shown in phantom by reference numeral 34A in FIG. 1. Indexing pin 34 may be maintained in an engaged position by spring 36 and spring stop 35, which is attached to indexing pin 34. Thus, pulling indexing pin 34 moves spring stop away from the indexing plate and compresses spring 36. Energy stored in the spring returns pin 34 to its original engaged position.

As shown in FIG. 4, knob 52 may be provided on the outside of lower control plate 40. Knob 52 is connected to indexing plate 32 so that rotating knob 52 also rotates indexing plate 32. If this rotation is commenced while pin 34 is disengaged, the pin will press and slide against the side of indexing plate 32 until an indexing position 33 is aligned with the indexing pin 34. Thus, by disengaging pin 34 and rotating knob 52 a user may rotate article 20 to position each of seven sides for slicing to form the tourné shape 10 as shown in FIG. 6. The side of indexing plate 32 may be curved inwardly or ratcheted, to encourage the pin 34 into engagement position 33. The indexing mechanism may comprise metal, plastic, wood or other suitable material.

To prevent debris, fingers, or other foreign objects from entering the indexing mechanism, an upper mounting plate 38 and lower control plate 40 may be joined to at least partially enclose the indexing mechanism. In the embodiment of FIGS. 1-5, upper mounting plate 38 and lower control plate 40 may be connected in any conventional manner including using friction pins or by screwing the upper mounting plate 38 and lower control plate 40 together with screws 42 as shown in FIGS. 1 and 4. Screws 42 may be connected to or integral with foot portion 44. Alternatively, the screws could be inserted through a surface, such as a tabletop (not shown) to fix the device permanently or semi-permanently to a particular workspace. Lower control plate 40 may also be connected to a removable retainer plate 46 by, for example, screws 48 to allow access to and cleaning of the indexing mechanism.

Article 20 may be elevated from the upper mounting plate 38 by platform 50 to reduce friction while advancing article 20 through the rotating and slicing process. Upper mounting plate 38, lower control plate 40, screws 42, feet 44, and any portion of base 18 may comprise metal, plastic, wood or other suitable material.

The cutting device may be handheld, and its component parts may be separated for cleaning, transportation, or storage. As shown in FIG. 7, the cutting portion 16 may be separated from base portion 18. The cutting portion 16 may further be stacked on top of base portion 18. Preferably, the cutting portion 16 and base portion 18 can be nested so that the arced portion of blade guide 22 may extend as high as or higher than holders 26, thus serving to shield holders 26, which may be sharp.

This stacked arrangement may also be inserted into a container 60 that may have a lid 64 with a flap 62 or other fastening or securing means (see FIG. 8). The lid 64 may be attached to container 60 by hinge 66. Container 60 may be plastic, metal, paper, wood, or other like material. The container may comprise any conventional arrangement, the illustrated container in FIGS. 7 and 8 being only one example. As shown in FIGS. 7 and 8, the nested cutting portion 16 and base 18 may be held relatively stationary within container 60 by contacting the sides of container 60 with guides 22, pins 27, upper mounting plate 38, lower control plate 40, feet 44 or any combination thereof. Base 18 additionally may be held stationary by virtue of the nested relationship with cutting portion 16.

FIGS. 9-15 illustrate a tourné cutting device according to another embodiment that comprises a cutting portion 96, a base portion 98, and a chopping portion 97. As shown in FIG.

10, the chopping portion 97 may engage an article 100A to pre-size the article 100A into an article 100 for use with the cutting portion. The cutting portion 96 and base portion 98 of the tourné cutting device engage the article 100, such as a potato, root, vegetable or other item, which is desired to be sliced into a tourné shape.

As shown in FIGS. 11 and 12, the cutting portion 96 of the tourné cutting device has a blade guide 102 that is designed to accept any slicing means 104, such as a blade, wire or knife. The slicing means 104 is shown as a knife in FIGS. 12 and 14 to illustrate operation of the device, but is not meant to limit the invention. The guide 102 is shaped so as to guide the knife 104 along a path that will cut the tourné profile into one side of the article 100. The support arm 101 supports the guide 102 and may include a holder 110 for holding the article 100 relative to the cutting portion 96. Any part of the cutting portion 96 may comprise metal, plastic, wood or other suitable material for contacting foods.

As shown in FIG. 12, the article 100 may be fixed relative to the cutting portion 96 and the base portion 98. For example, the article 100 may be fixed to the base portion 98 by a first holder 106 (see FIG. 9), such as a star-shaped protrusion. The first holder 106 is shown to have an irregular cross section, such as a cross-shape, to illustrate the operation of the holder 106 which is capable of keeping the article 100 from spinning relative to the holder 106.

A second holder 110, which may be a needle or double needle (a single needle is shown in FIGS. 9, 10, 12 and 13), may then be inserted by pressing the head 108 of the second holder 110 toward the article 100. The second holder 110 holds the article 100 relative to the cutting portion 96. Although the FIGS. 9, 10, 12, and 13 illustrate a combination of a star-shaped holder and a needle-shaped holder, any holding utensils may be used, such as those disclosed in U.S. Pat. No. 6,659,522 to Byth. Furthermore, as shown in FIG. 10, the article 100 may be initially fixed to the cutting portion 96 by inserting the second holder 110 into the article 100 and then fixing the article to the first holder 106. Alternatively, the cutting portion 96 may be initially joined with the base portion 98 after which the article is fixed to the first holder 106 while pulling the head 108 of the second holder 110 away from the article 110 and then the second holder 110 is inserted into the article 100 by pressing the head 108 of the second holder 110 toward the article.

The blade guide 102 may be aligned relative to the article 100 for cutting a first side of a tourné shape 90 simply by virtue of the fact that the article 100 is fixed relative to the cutting portion 96 and the base portion 98. As shown in FIG. 14, preferably the blade guide 102 permits the blade 104 to travel along the guide without binding or other interruption to slice a side of the article 100 into a predetermined shape, such as an arc in the case of the tourné shape 90 (see FIG. 16). The cross-section of each side of the guide 102 may contact the blade 104 only at a point 103 (see FIG. 10) to reduce friction of the blade 104 along the path of travel and to reduce scratching, dulling or other damage to the blade 104.

As shown in FIGS. 9-14, an indexing mechanism allows the repositioning of the article 100 for creating multiple arced slices. As particularly shown in FIGS. 10 and 14, the indexing mechanism may comprise a circular dial 112 with an indexing portion 117 on a lower portion of the circular dial 112. The indexing portion 117 may have a multiplicity of indexing positions 113, such as slots or holes, for receiving an indexing pin 114. In the case of a tourné cutting device, the indexing portion 117 may have, for example, seven engagement positions 113 to permit the formation of seven slices. As shown in FIG. 10, the indexing pin 114 can be disengaged by pulling it outward from the indexing portion 117 into a disengaged position, such as shown in phantom by reference numeral 114A. The indexing pin 114 may be maintained in an engaged position by a spring 116 and a spring stop 115, which is attached to the indexing pin 114. Thus, pulling the indexing pin 114 moves the spring stop away from the indexing portion 117 and compresses the spring 116. Energy stored in the spring returns the pin 114 to its original engaged position.

As shown in FIG. 12, a gripping portion 122 may be provided on an upper portion of the circular dial 112. The gripping portion 122 may have a multiplicity of fingertip-sized indentations 124 provided to conveniently allow rotation of the disengaged indexing mechanism to the next engagement position. In the case of a tourné cutting device, the gripping portion 122 may have, for example, seven fingertip-sized indentations 124 to represent the formation of seven slices. The seven fingertip-sized indentations 124 may be vertically aligned with seven corresponding indexing positions 113 to conveniently visually indicate the location of the current indexed position. The gripping portion 122 is shown in FIGS. 12-14 as having fingertip-sized indentations 124, but this illustration is not meant to limit the invention, which may include any other known gripping alternative.

The gripping portion 122 is connected to the indexing portion 117 so that the circular dial 112 also rotates the indexing portion 117. As shown in FIG. 14, if this rotation is commenced while the pin 114 is disengaged, the pin 114 will press and slide against the side of the indexing portion 117 until an indexing position 113 is aligned with the indexing pin 114. Thus, by disengaging the indexing pin 114 and rotating the circular dial 112 a user may rotate the article 100 to position each of seven sides for slicing to form the tourné shape 90 (also shown in FIG. 17). The side of the indexing portion 117 may be curved inwardly or ratcheted, to encourage the pin 114 into an engagement position 113.

As shown in FIG. 10, to prevent debris, fingers, or other foreign objects from entering the indexing mechanism, the indexing portion 117 of the circular dial 112 may be recessed into the base portion 98, thereby concealing the indexing portion 117 below a top surface 120 of the base portion 98. The indexing pin 114 may then engage the indexing positions 113 of the indexing portion 117 through a side 126 of the base portion 98. To reduce friction while advancing the article 100 through the rotating and slicing process, the indexing mechanism may rotate utilizing a pivot point, an axle-bearing assembly, or any other friction reducing configuration known in the art. The indexing mechanism may comprise metal, plastic, wood or other suitable material for contact with food. It may be advantageous in some applications to pre-cut the article to a size that is better accommodated within the blade guide 102. As shown in FIG. 10, a chopping portion 97 may be included as an integral or separate section of the base 98. The chopping portion 97 has a blade portion 78, a handle 76, and a retainer 72. The retainer 72 is shown in FIGS. 9-11 in the form of a chopping block, but is not meant to be limiting. The chopping block 72 is shaped with a beveled or concave top surface 73 for retaining the article 10A. The chopping block may be integral with or separably attachable to a side 128 of the base portion 98. As shown in FIG. 11, the width of the chopping block is sized to represent the height of the article 100 and correspondingly, the height of the tourné shape 90. The chopping block 72 is shown in FIG. 9 as being integrated with the base portion 98, however this is not meant to be limiting, as the chopping portion 97, including the chopping block 72, may be detachable and/or separately operable.

As shown in FIG. 1, the blade portion may have two blades 78 being reflectively identical, both blades having two ends, a first end 74 and a second end 75, and a cutting edge 83 (as further shown in FIG. 15). The first end 74 of each blade may be pivotally connected to opposite sides 86 of the chopping block 72 using a shoulder screw 88 or any other suitable fastening or securing means. The second end 75 of each blade may be connected to opposite ends 84 of the handle 76 using a screw 85 or any other suitable fastening or securing means, where the opposite ends 84 of the handle 76 are spaced at about the same distance as the width of the chopping block 72.

As shown in FIG. 10, the chopping portion 97 may chop the article 100A into the pre-sized article 100 by moving the handle 76 to an upward position A, placing the article 100A in the retainer such that it spans the opposite sides 86 of the chopping block 72 (as further shown in FIG. 11), and then moving the handle 76 to a downward position C, thereby engaging the cutting edge 83, as illustrated by position B, and chopping the article 100A into the pre-sized article 100. Afterwards, the pre-sized article 100 may then be fixed to the base portion 98 and the cutting portion 96. In the instance that, prior to chopping, the article 100A is already properly sized for fixing in the cutting portion 96 and the base portion 98, the pre-sizing step using the chopping portion 97 may be skipped.

Although illustrated as a board that may rest on top of a table or counter-top or work surface, the cutting device described above may be handheld.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings, and/or the skill or knowledge in the art of article shaping, particularly the shaping and cutting of items.

The embodiments described hereinabove are further intended to explain the best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A cutting device for cutting an article, comprising:
   a cutting portion comprising a curved blade guide having a top portion and a bottom portion, a support arm attached to the blade guide, and a needle-shaped first holder contacting the support arm; and
   a base portion connectable to the cutting portion, the base portion comprising a second holder having an irregular cross section and an indexing mechanism, wherein the first and second holders hold the article stationary relative to the base portion when cutting said article with a slicing means that travels along the curved blade guide from the top portion to the bottom portion, and wherein the indexing mechanism permits rotation of the article relative to the cutting portion.

2. The cutting device of claim 1 wherein the cross section of second holder is star-shaped with at least three arms.

3. The cutting device of claim 2 wherein the cross section of star-shaped second holder is four-armed, forming a cross.

4. The cutting device of claim 1 wherein the indexing mechanism comprises a circular dial with a gripping portion, engagement portions, and a pin for engaging the engagement portions.

5. The cutting device of claim 4 wherein the gripping portion comprises one or more fingertip-sized indentations along a radially outward surface of the circular dial.

6. A cutting device for cutting an article, comprising:
   a cutting portion comprising a curved blade guide having a top portion and a bottom portion, a support arm attached to the blade guide, and a needle-shaped first holder contacting the support arm;
   a base portion connectable to the cutting portion, the base portion comprising a second holder and an indexing mechanism, wherein the first and second holders hold the article stationary relative to the base portion when cutting said article with a slicing means that travels along the curved blade guide from the top portion to the bottom portion, and wherein the indexing mechanism permits rotation of the article relative to the cutting portion; and
   a chopping portion associated with the base portion for pre-shaping the article.

7. The cutting device of claim 6 wherein the chopping portion comprises a blade portion, a handle connectable to the blade portion, and a retainer to retain the article.

8. The cutting device of claim 7 wherein the retainer comprises a chopping block joined with the base portion, the chopping block having a beveled top surface for retaining the article.

9. The cutting device of claim 7 wherein the blade portion comprises a first blade having a first end and a second end, the first end pivotally connected to a side of the retainer and the second end connected to a first end of the handle, and a second blade having a first end and a second end, the first end pivotally connected to an opposite side of the retainer and the second end connected to an opposite end of the handle.

10. The cutting device of claim 7, wherein the retainer comprises a chopping block that has a beveled top surface for retaining the article.

11. The cutting device of claim 7, wherein the retainer comprises a chopping block detachable from the base portion.

12. The cutting device of claim 6, wherein the second holder is star-shaped in cross section with at least three arms.

13. The cutting device of claim 12 wherein the cross section of star-shaped second holder is four-armed, forming a cross.

14. The cutting device of claim 6 wherein the indexing mechanism comprises a circular dial with a gripping portion, engagement portions, and a pin for engaging the engagement portions.

15. The cutting device of claim 14 wherein the gripping portion comprises one or more fingertip-sized indentations along a radially outward surface of the circular dial.

* * * * *